United States Patent
Wang et al.

(10) Patent No.: US 9,241,142 B2
(45) Date of Patent: Jan. 19, 2016

(54) DESCRIPTOR-BASED STREAM PROCESSOR FOR IMAGE PROCESSING AND METHOD ASSOCIATED THEREWITH

(71) Applicants: Yong Wang, Beijing (CN); Jianrong Chen, Andover, MA (US); Yimiao Zhao, Beijing (CN); Youcheng Huang, Beijing (CN); Xiaoming Chi, Beijing (CN)

(72) Inventors: Yong Wang, Beijing (CN); Jianrong Chen, Andover, MA (US); Yimiao Zhao, Beijing (CN); Youcheng Huang, Beijing (CN); Xiaoming Chi, Beijing (CN)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 13/749,675

(22) Filed: Jan. 24, 2013

(65) Prior Publication Data

US 2014/0204232 A1 Jul. 24, 2014

(51) Int. Cl.
H04N 9/04 (2006.01)
H04N 5/232 (2006.01)

(52) U.S. Cl.
CPC ............ *H04N 9/04* (2013.01); *H04N 5/23229* (2013.01)

(58) Field of Classification Search
CPC .............................. H04N 5/23229; H04N 1/60
USPC ........................ 348/241, 222.1; 382/261, 254
See application file for complete search history.

(56) References Cited

U.S. PATENT DOCUMENTS

| | | | |
|---|---|---|---|
| 2006/0147109 A1* | 7/2006 | Munsil et al. | 382/162 |
| 2006/0147110 A1* | 7/2006 | Munsil | 382/162 |
| 2009/0077359 A1* | 3/2009 | Chakravarthula et al. | 712/229 |
| 2009/0190837 A1* | 7/2009 | Forutanpour | 382/203 |
| 2011/0050732 A1* | 3/2011 | Arrasvuori | 345/666 |
| 2011/0274366 A1* | 11/2011 | Tardif | 382/260 |
| 2013/0050420 A1* | 2/2013 | Chen et al. | 348/43 |
| 2013/0121411 A1* | 5/2013 | Robillard et al. | 375/240.12 |
| 2013/0279781 A1* | 10/2013 | Ding et al. | 382/131 |
| 2013/0339891 A1* | 12/2013 | Blumenberg et al. | 715/771 |
| 2014/0023243 A1* | 1/2014 | Nagaraj et al. | 382/110 |

FOREIGN PATENT DOCUMENTS

JP 2012-23498 8/2013

OTHER PUBLICATIONS

1st JP Office Action issued in Japanese Patent Application Serial No. 2014-11404 mailed Apr. 21, 2015, 4 pages.
English Translation of 1st JP Office Action issued in Japanese Patent Application Serial No. 2014-11404 mailed Apr. 21, 2015, 3 pages.

* cited by examiner

*Primary Examiner* — Mekonnen Dagnew
(74) *Attorney, Agent, or Firm* — Patent Capital Group

(57) ABSTRACT

The present disclosure provides a stream processor, an associated stream controller and compiler, and associated methods for data processing, such as image processing. In some embodiments, a method includes defining a kernel pattern associated with an image frame, and processing the image frame using the defined kernel pattern. The method can further include generating a kernel switch lookup table based on the defined kernel pattern. In various implementations, the stream controller is operable to direct execution of kernels on the image frame according to the defined kernel pattern and the kernel switch lookup table.

20 Claims, 9 Drawing Sheets

HORIZONTAL DESCRIPTOR ASSEMBLER CODE

EXAMPLE:
HDES0 =
KERNEL 0
50 // KERNEL WIDTH
0 // 0: NO LOOP 1: LOOP START 2: LOOP END
HDES_END

HDES1 =
KERNEL 1
200 // KERNEL WIDTH
2 // LOOP END
32 // LOOP NUMBER
HDES_END

HDES4 =
KERNEL 2
200 // KERNEL WIDTH
2 // LOOP END
32 // LOOP NUMBER
HDES_END

HDES5 =
KERNEL 0
1600 // KERNEL WIDTH
1 // LOOP START
HDES_END

VERTICAL DESCRIPTOR ASSEMBLER CODE

EXAMPLE:
VDES0 =
HDES_LINK 0
32 // KERNEL HEIGHT
0 // 0: NO LOOP 1: LOOP START 2: LOOP END
VDES_END

VDES1 =
HDES_LINK 1
80 // KERNEL HEIGHT
1 // LOOP START
VDES_END

VDES3 =
HDES_LINK 2
50 // KERNEL HEIGHT
2 // LOOP END
200 // LOOP NUMBER
VDES_END

FIG. 5

DESCRIPTOR-BASED STREAM PROCESSOR FOR IMAGE PROCESSING AND METHOD ASSOCIATED THEREWITH

TECHNICAL FIELD

The present disclosure relates generally to stream processors for image processing, and more particularly, to a stream controller, associated compiler, and associated methods for image processing of stream processors.

BACKGROUND

Digital cameras and image sensor devices (such as CCD/CMOS image sensors) have gained significant popularity in recent years. Various efforts have been made to improve image processing in image sensor devices. For example, a camera typically includes an analog/digital front-end and a digital back-end. Complex digital back-end processors have been developed to improve camera performance, such as DIGIC 5 manufactured by Canon, Inc. These back-end processors can provide various camera functions, such as noise cancellation, shading correction, face detection, fix-pattern noise correction, anti-shaking, high ISO, other desired functions, or combinations thereof. The back-end processors are powerful, however, the development cycle is long and cost is high, and bandwidth also limits functions performed by the digital back-end processors. Accordingly, some functions have been moved to the digital front-end processor to reduce the back-end processor workload. For example, a fixed circuit can be incorporated into the digital front-end processor, such as a fix pattern noise removal circuit and a reorder circuit. Such circuits, though powerful, require redesigning the digital front-end processor, which is time-consuming and not cost effective.

A programmable stream image processor provides a high efficiency and low latency solution for handling different camera applications. For example, various programming can be implemented to ensure the stream processor can deal with fix-pattern noise correction, reorder functions, and other desired functions. A stream controller is a key part of a programmable stream processor, as the stream controller controls data processing flows and kernel switching when processing an image. Although existing programmable stream processors and associated stream controllers have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

FIGS. 4-6 provide exemplary assembler code for implementing the descriptor-based kernel definition defining a kernel performed on an image frame during image processing according to various aspects of the present disclosure.

OVERVIEW OF EXAMPLE EMBODIMENTS

Figure 1A:
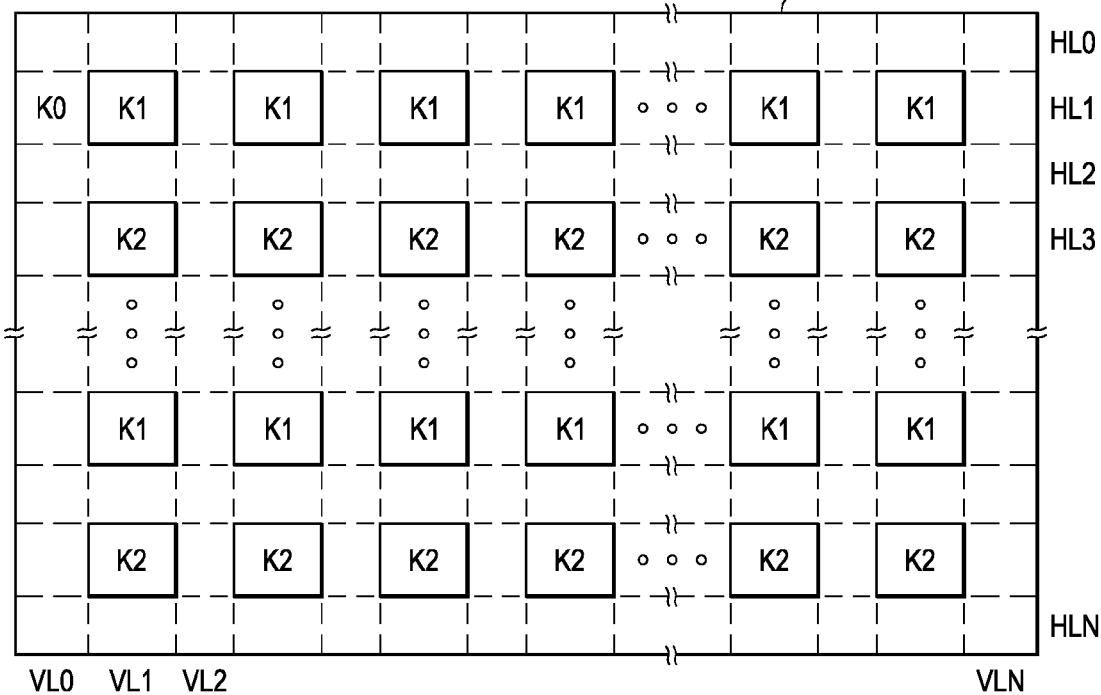
FIGS. 1A-1C are schematic block diagrams of various exemplary kernel patterns that can be applied to an image frame during image processing according to various aspects of the present disclosure.

The present disclosure provides for various stream processor embodiments to be implemented in any suitable environment. One example embodiment provides a method for processing an image frame. Some embodiments include defining a kernel pattern associated with an image frame, and processing the image frame using the defined kernel pattern. In various implementations, defining the kernel pattern associated with the image frame includes defining a kernel block associated with the image frame; defining a kernel descriptor associated with the image frame; and defining a link table associated with the image frame. The method may further include generating a kernel switch lookup table based on the defined kernel pattern. In various implementations, defining the kernel block associated with the image frame includes grouping pixels of the image frame having a same kernel performed thereon during processing. In various implementations, defining the kernel descriptor associated with image frame includes defining an image frame portion of the image frame, and defining a vertical descriptor and a horizontal descriptor associated with the image frame portion. The horizontal descriptor can define a kernel associated with the image frame portion, define a kernel width associated with the image frame portion, and/or define a loop characteristic associated with the image frame portion in a horizontal direction. The vertical descriptor can define the link table associated with the image frame portion, and define a kernel height associated with the image frame portion, and/or define a loop characteristic associated with the image frame portion in a vertical direction. In various implementations, the link table associated with the image frame includes a horizontal link table and a vertical link table. The horizontal link table can define a kernel sequence in a horizontal direction, and the vertical link table can define a kernel sequence in a vertical direction. In various implementations, processing the image frame using the defined kernel pattern includes fetching a vertical link table associated with the image frame; fetching a vertical descriptor associated with the vertical link table; fetching a horizontal link table associated with vertical descriptor; fetching a horizontal descriptor associated with the horizontal link table; and fetching a kernel associated with the horizontal descriptor. The processing can further include processing, using the kernel, an image frame portion associated with the vertical descriptor and the horizontal descriptor.

In some embodiments, a non-transitory computer readable medium encoded with instructions that when executed by one or more processors of a processing system cause execution of the methods described herein. In some embodiments, an apparatus includes a stream controller. In various implementations, the stream controller includes a kernel storage memory for storing a defined kernel pattern associated with an image frame and a kernel look up table (LUT) memory for storing a kernel switch lookup table associated with the defined kernel pattern. In various implementations, the stream controller is operable to direct execution of various kernels on the image frame according to the defined kernel pattern and the kernel switch lookup table. The stream controller can further include at least two kernel buffers for storing kernels to be performed on the image frame. In some embodiments, the apparatus further includes an image processor that includes a stream processing unit, wherein the stream controller is operable to direct the stream processing unit to execute the kernels on the image frame according to the defined kernel pattern. In some embodiments, the apparatus further includes a compiler operable to generate the kernel switch look up table based on the defined kernel pattern. In various implementations, the apparatus implements the methods described herein.

DETAILED DESCRIPTION OF EXAMPLE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Figure 1B:
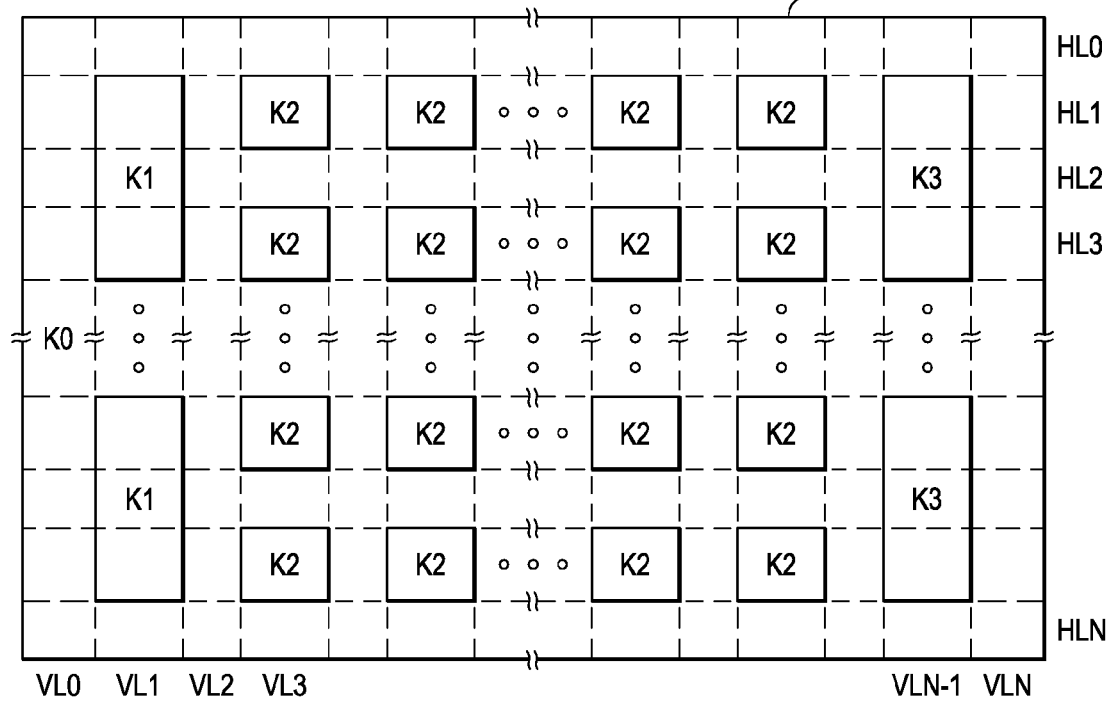
Figure 1C:
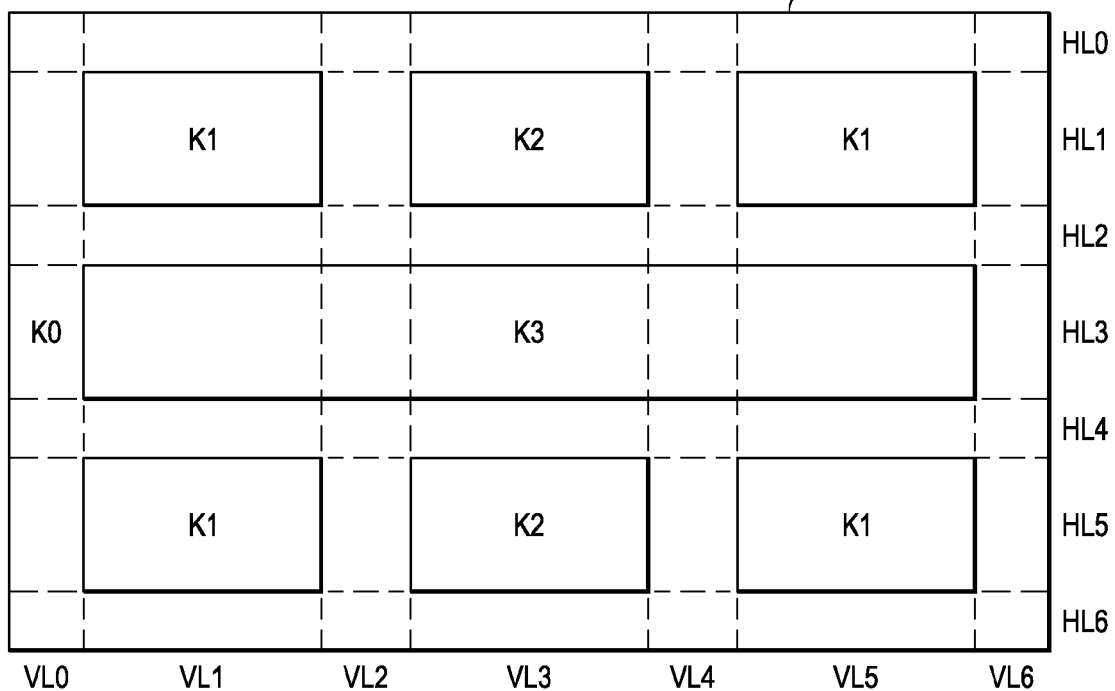

FIGS. 1A-1C are schematic block diagrams of various kernel patterns that can be applied to an image frame 100 during image processing according to various aspects of the present disclosure. FIGS. 1A-1C have been simplified for the sake of clarity to better understand the inventive concepts of the present disclosure. Additional features can be added in the image frame 100 and associated kernel patterns, and some of the features described below can be replaced or eliminated in other embodiments of the image frame 100 and associated kernel patterns.

FIG. 1A illustrates a kernel pattern 110 that can be applied to the image frame 100 during image processing, where the kernel pattern 110 includes kernel 0 (K0) (for example, a background kernel), kernel 1 (K1), and kernel 2 (K2). K0, K1, and K2 operate on the image frame 100 according to the kernel pattern 110. The image frame 100 can be partitioned into groups of horizontal pixel lines HL0, HL1, HL2, . . . HLN and groups of vertical pixel lines VL0, VL1, VL2, . . . VLN to define various kernel sequences within the kernel pattern 110. For example, in an x-direction (or horizontal direction), the image frame 100 can be partitioned to define the following kernel sequences of the kernel pattern 110:

a first group of horizontal image lines, such as the group of horizontal image lines HL0, processed according to K0;

a second group of horizontal image lines, such as the group of horizontal image lines HL1, processed according to a kernel sequence K0→K1→K0→K1→K0, where the first K1→K0 repeats a number of times within the kernel sequence;

a third group of horizontal image lines, such as the group of horizontal image lines HL2, processed according to K0;

a fourth group of horizontal image lines, such as the group of horizontal image lines HL3, processed according to a kernel sequence K0→K2→K0→K2→K0, where the first K2→K0 repeats a number of times within the kernel sequence; and so on until the image frame 100 is processed.

The kernel pattern 110 includes loops among the kernel sequences defined in the horizontal direction. For example, in a y-direction (or vertical direction), the image frame 100 can be partitioned to define the loops of the kernel sequences defined by the horizontal image lines, such as:

a first group of vertical image lines, such as the group of vertical image lines VL0, continuously loops K0;

a second group of vertical image lines, such as the group of vertical image lines VL1, includes a looping kernel sequence K0→K1→K0→K2→K0 that repeats a number of times;

a third group of vertical image lines, such as the group of vertical image lines VL2, continuously loops K0; and so on until the image frame 100 is processed.

In the vertical direction, the above loop may loop a number of times depending on the image processing requirements.

FIG. 1B similarly illustrates a kernel pattern 120 that can be applied to the image frame 100 during image processing, where the kernel pattern 120 includes K0, K1, K2, and kernel 3 (H3) for operating on the image frame 100. The image frame 100 can be partitioned into groups of horizontal pixel lines HL0, HL1, HL2, . . . HLN and groups of vertical pixel lines VL0, VL1, VL2, . . . VLN to define various kernel sequences within the kernel pattern 120. For example, in an x-direction (or horizontal direction), the image frame 100 can be partitioned to define the following kernel sequences of the kernel pattern 120:

a first group of horizontal image lines, such as the group of horizontal image lines HL0, processed according to K0;

a second group of horizontal image lines, such as the group of horizontal image lines HL1 and the group of horizontal image lines HL3, processed according to a kernel sequence K0→K1→K0→K2→K0→H3→K0 where K2→K0 repeats a number of times within the kernel sequence;

a third group of horizontal image lines, such as the group of horizontal image lines HL2, processed according to a kernel sequence K0→K1→K0→H3→K0; and so on until the image frame 100 is completely processed.

The kernel pattern 120 includes loops among the kernel sequences defined in the horizontal direction. For example, in a y-direction (or vertical direction), the image frame 100 can be partitioned to define the loops of the kernel sequences defined by the horizontal image lines, such as:

a first group of vertical image lines, such as the group of vertical image lines VL0, that continuously loops K0;

a second group of vertical image lines, such as the group of vertical image lines VL1, that includes a looping kernel sequence K0→K1→K0→K1→K0 where the first K1→K0 repeats a number of times within the kernel sequence;

a third group of vertical image lines, such as the group of vertical image lines VL2, that continuously loops K0;

a fourth group of vertical image lines, such as the group of vertical image lines VL3, that includes a looping kernel sequence K0→K2→K0→K2→K0, where the first K2→K0 repeats a number of times within the kernel sequence;

a N−1 group of vertical image lines, such as the group of vertical image lines VLN-1, that includes a looping kernel sequence K0→H3→K0→H3→K0 where the first H3→K0 repeats a number of times within the kernel sequence; and so on until the image frame 100 is processed.

In vertical direction, the above loop may loop number of times depending on the image Processing requirements.

FIG. 1C similarly illustrates a kernel pattern 130 that can be applied to the image frame 100 during image processing, where the kernel pattern 130 includes K0, K1, K2, and H3 for operating on the image frame 100. The image frame 100 can be partitioned into groups of horizontal pixel lines HL0, H11, HL2, HL3, HL4, HLS, and HL6 and groups of vertical pixel lines VL0, V11, VL2 , VL3, VL4, VLS, and VL6 to define various kernel sequences within the kernel pattern 130. For example, in an x-direction (or horizontal direction), the image frame 100 can be partitioned to define the following kernel sequences of the kernel pattern 130:

a first group of horizontal image lines, such as the group of horizontal image lines HL0 and the group of horizontal image lines HL6, processed according to K0;

a second group of horizontal image lines, such as the group of horizontal image lines HL1 and the group of horizontal image lines HL5, processed according to a kernel sequence K0→K1→K0→K2→K0→K1→K0;

a third group of horizontal image lines, such as the group of horizontal image lines HL2 and the group of horizontal image lines HL5, processed according to K0; and so on until the image frame 100 is completely processed.

The kernel pattern 130 also includes loops among the kernel sequences defined in the horizontal direction. For example, in a y-direction (or vertical direction), the image frame 100 can be partitioned to define the loops of the kernel sequences defined by the horizontal image lines, such as:

a first group of vertical image lines, such as the group of vertical image lines VL0 and the group of vertical image lines VL6, that continuously loops K0;

a second group of vertical image lines, such as the group of vertical image lines VL1 and the group of vertical image lines VL5, that includes a looping kernel sequence K0→K1→K0→H3→K0→K1→K0;

a third group of vertical image lines, such as the group of vertical image lines VL2 and the group of vertical image lines VL4, that continuously loops K0;

a fourth group of vertical image lines, such as the group of vertical image lines VL3, that includes a looping kernel sequence K0→K2→K0→H3→K0→K2→K0 ; and so on until the image frame 100 is processed.

In vertical direction, the above loop may loop number of times depending on the image processing requirements.

As evidenced by the kernel patterns in FIGS. 1A-1C, a kernel operation performed on an image frame, such as the image frame 100, can vary greatly depending on image processing requirements. For image sensor devices (for example, digital cameras) to continue to evolve to provide further powerful, dynamic, and efficient image processing, such image sensor devices need the ability to vary the image processing requirements, such as the kernel operation to be performed on various image frames. Conventional stream image processors implemented in image sensor devices can suffer from one of two issues: (1) inability to apply more than one kernel to an image frame, or (2) require additional hardware for applying multiple kernels to an image frame, where oftentimes, such hardware misses data when switching kernels. To address various shortcomings of current image processing apparatuses and methods, such as those previously stated, the present disclosure provides a method for defining a kernel pattern of an image frame, and an image processor and associated stream controller for implementing the defined kernel pattern for image processing. By implementing a descriptor-based kernel definition method described herein, an image processor (implementing the stream controller disclosed herein) can seamlessly process an image frame using multiple kernels, where a number of kernels used to process an image frame is limited only by a memory size.

Figure 2:
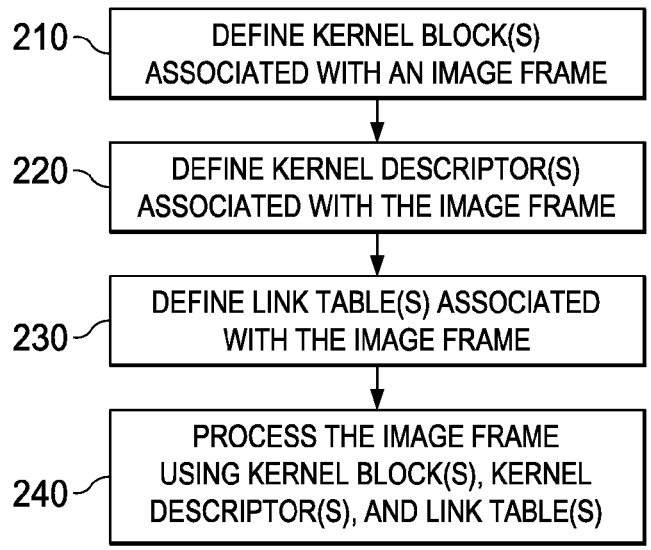
FIG. 2 is a flowchart of an exemplary method for defining a kernel pattern associated with a kernel (operation or computation) to be performed on an image frame that can be implemented by an image processor to process the image frame according to various aspects of the present disclosure.
Figure 3:
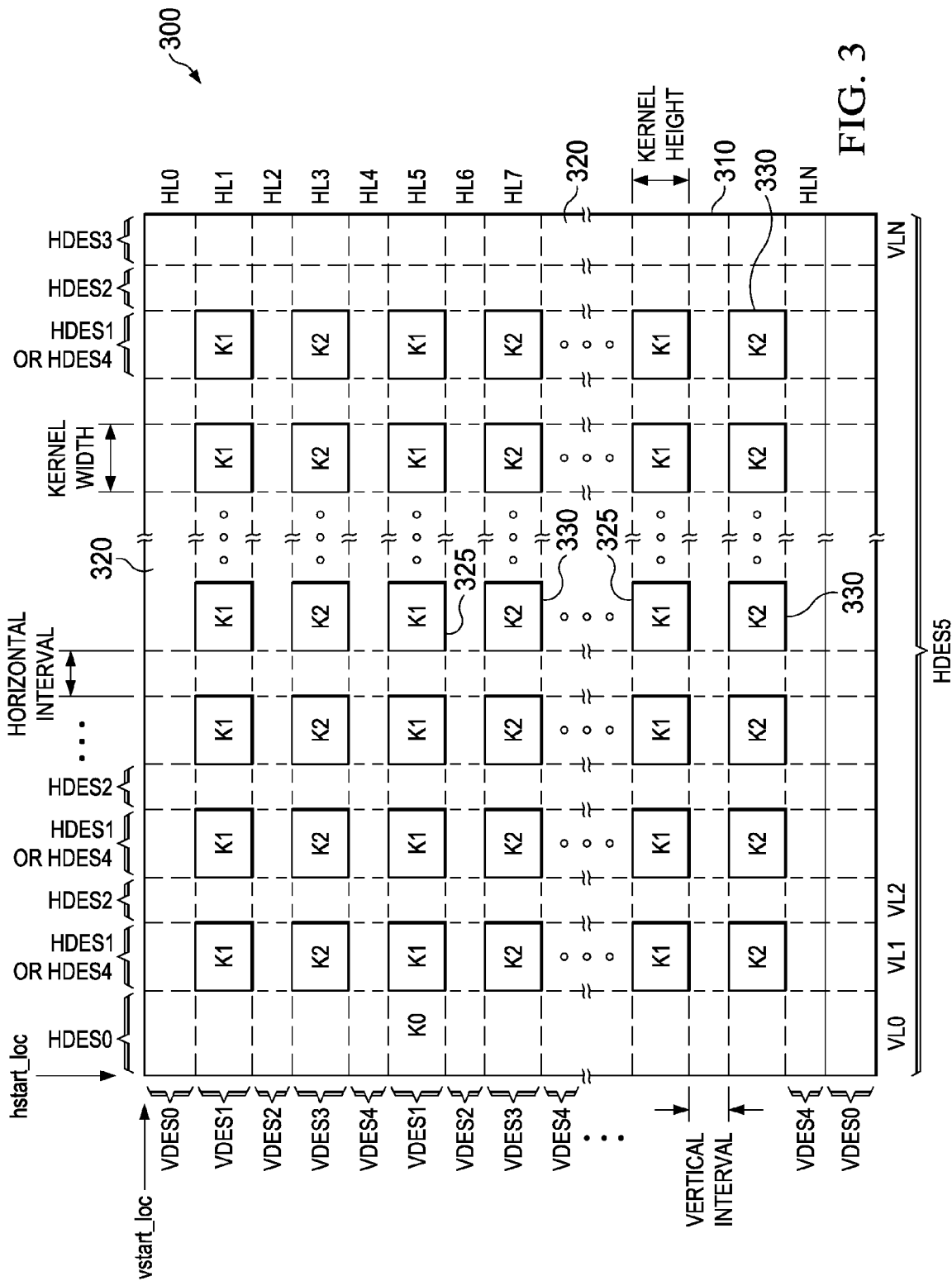
FIG. 3 is a schematic block diagram of an exemplary kernel pattern of an image frame that can be defined during image processing by implementing the method of FIG. 2 according to various aspects of the present disclosure.

FIG. 2 is a flowchart of a method 200 for defining a kernel pattern associated with a kernel (operation) to be performed on an image frame that can be implemented by an image processor to process the image frame according to various aspects of the present disclosure. As described in detail below, the method 200 defines the kernel pattern by defining kernel block(s), kernel descriptor(s), and link table(s) that identify various kernels to be performed on the image frame. FIG. 3 is a schematic block diagram of a kernel pattern 300 of an image frame 310 that can be defined during image processing by implementing the method 200 of FIG. 2 according to various aspects of the present disclosure. FIGS. 2 and 3 will be discussed concurrently and have been simplified for the sake of clarity to better understand the inventive concepts of the present disclosure. Additional steps can be provided before, during, and after the method 200 and some of the steps described can be replaced or eliminated for other embodiments of the method 200. Further, additional features can be added in the kernel pattern 300 and image frame 310, and some of the features described below can be replaced or eliminated in other embodiments of kernel pattern 300 and image frame 310.

The method 200 begins at block 210 by defining kernel block(s) associated with the image frame, such as the image frame 310. Defining kernel block(s) groups image pixels depending on a kernel (operation) to be performed on the image pixels, such that a kernel block includes one or more pixels of the image frame where a same kernel (operation or calculation) is performed thereon. The kernel includes all operations to be performed on an image pixel (including associated arithmetic logic unit (ALU) and memory (MEM) operation codes (opcodes) that specify the kernel operations to be performed for image processing, such as ADD, SUBSTRACT, LOAD, STORE, other operation, or combinations thereof, and/or pipeline stage information for processing the image frame 310). For example, in FIG. 3, three different kernel operations can be performed on the image frame 310 (kernel 0 (K0 ), kernel 1 (K1), and kernel 2 (K2)), and the image frame 310 is partitioned to define kernel block 320 associated with K0, kernel blocks 325 associated with K1, and kernel blocks 330 associated with K2. During processing of the image frame 310, K0 will be performed on the pixels of the image frame 310 included in the kernel block 320, K1 will be performed on the pixels of the image frame 310 included in the kernel blocks 325, and K2 will be performed on the pixels of the image frame 310 included in the kernel blocks 330.

The method continues to block 220 by defining kernel descriptor(s) associated with the image frame. The kernel descriptors indicate kernel operation sequences applied to the image frame, further defining the kernel pattern 300. In the present example, the image frame 310 is partitioned into groups of horizontal pixel lines HL0, HL1, HL2, ... HLN and groups of vertical pixel lines VL0, VL1, VL2, ... VLN to define image frame portions, where each image frame portion has an associated kernel descriptor. In the present example, the image frame 310 can be partitioned to define similar image frame portions, such that similar image frame portions have a same kernel descriptor. The kernel descriptor includes a horizontal descriptor (HDES) and a vertical descriptor (VDES), and accordingly, each image frame portion has an associated horizontal descriptor and an associated vertical descriptor. The horizontal descriptor defines various kernel attributes of its associated image frame portion in a horizontal direction, such as a kernel ID (defining a kernel that operates on the associated image frame portion, such as K0, K1, or K2), kernel width (defining a horizontal pixel width of the kernel associated with the image frame portion), loop flag (defining whether the associated image frame portion is a loop start, loop end, or no loop in the horizontal direction), loop number (defined when the associated image frame portion is a loop end in the horizontal direction), other information useful in describing the image frame portion in the horizontal direction, or a combination thereof. The vertical descriptor defines various kernel attributes of its associated image frame portion in the vertical direction, such as a HLINK ID (a horizontal link table associated with a horizontal pixel line group, described in detail below), kernel height (defining a number of horizontal pixel lines within the horizontal pixel line group, for executing the kernel associated with the HLINK ID), loop flag (defining whether the associated image frame portion is a loop start, loop end, or no loop in the vertical direction), loop number (defined when the associated image frame portion is a loop end in the vertical direction), other information useful in describing the image frame portion in the vertical direction, or a combination thereof.

In FIG. 3, the image frame 310 includes image frame portions that can be defined by horizontal descriptors HDES0, HDES1, HDES2, HDES3, HDES4, and HDES5 and vertical descriptors VDES0, VDES1, VDES2, VDES3, and VDES4. Alternative embodiments can define the image frame portions using various combinations of horizontal descriptors and vertical descriptors. In the present example, horizontal descriptors HDES0, HDES2, HDES3, and HDES5 designate image frame portions that are processed by K0 for image processing, where horizontal descriptors HDES0, HDES2, HDES3, and HDES5 have varying kernel widths and positions within the kernel sequence; horizontal descriptor HDES 1 designates image frame portions that are processed by K1 for image processing; and horizontal descriptor HDES4 designates image frame portions that are processed by K2 for image processing. The vertical descriptors VDES0, VDES1, VDES2, VDES3, and VDES4 designate horizontal pixel line groups having different kernel sequences. For example, vertical descriptors VDES0, VDES2, and VDES4 designate horizontal pixel line groups where K0 is the single kernel operation used for image processing, where the vertical descriptors VDES0, VDES2, and VDES4 have varying kernel heights and positions within the kernel sequence; vertical descriptor VDES1 designates horizontal pixel line groups where the kernel operation sequence includes alternating K0 and K1 kernel operations used for image processing; and vertical descriptor VDES3 designates horizontal pixel line groups where the kernel operation sequence includes alternating K0 and K2 kernel operations used for image processing.

The method continues to block 230 by defining link table(s) associated with the image frame. The link table(s) define horizontal descriptor sequences and vertical descriptor sequences present in the defined kernel pattern 300 of the image frame 310. In the present example, the link table includes a horizontal link table (HLINK) and a vertical link table (VLINK). The horizontal link table collects the horizontal image descriptors of a group of horizontal pixel lines, such that the image frame 310 may have numerous associated horizontal link tables. For example, in FIG. 3, the image frame 310 can have at least three associated horizontal link tables:

HLINK 0: HDES5
HLINK 1: HDES0→HDES1→HDES2→HDES3
HLINK 2: HDES0→HDES4→HDES2→HDES3 where for HLINK 1, HDES1 is a loop start and HDES2 is a loop end, and for HLINK 2, HDES4 is a loop start and HDES 2 is a loop end. In the present example, since the kernel operation sequence for horizontal pixel line group 0 (HL0), horizontal pixel line group 2 (HL2), horizontal pixel line group 4 (HL4), horizontal pixel line group 6 (HL6), and horizontal pixel line group N (HLN) is identical, HL0, HL2, HL4, HL6, and HLN can be processed using the same horizontal link table, particularly HLINK 0. Similarly, since the kernel operation sequence for horizontal pixel line group 1 (HL1), horizontal pixel line group 5 (HL5), and so on is identical, HL1, HL5, and other similar horizontal line groups can be processed using the same horizontal link table, particularly HLINK 1. Similarly, since the kernel operation sequence for horizontal pixel line group 2 (HL2), horizontal pixel line group 6 (HL6), and so on is identical, HL2, HL6, and other similar horizontal lines can be processed using the same horizontal link table, particularly HLINK 2. The number of horizontal link tables can thus be equivalent to a number of horizontal kernel operation sequences defined by the kernel pattern 300 of the image frame 310. In contrast, the vertical link table collects the vertical descriptors for an entire image frame, such that in the present example, the image frame 310 has one associated vertical link table. In FIG. 3, a vertical link table associated with the image frame 310 can be:

VLINK: VDES0→VDES1→VDES2→VDES3→VDES4→VDES0 where VDES0 is a loop start and VDES4 is a loop end.

Figure 4:
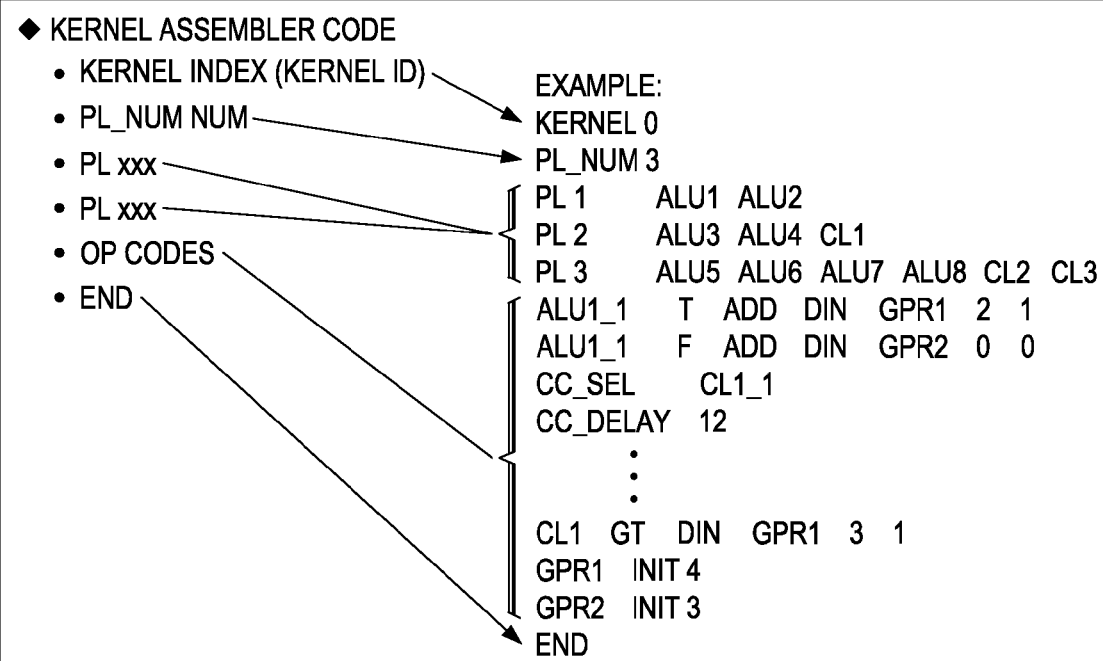
Figure 6:
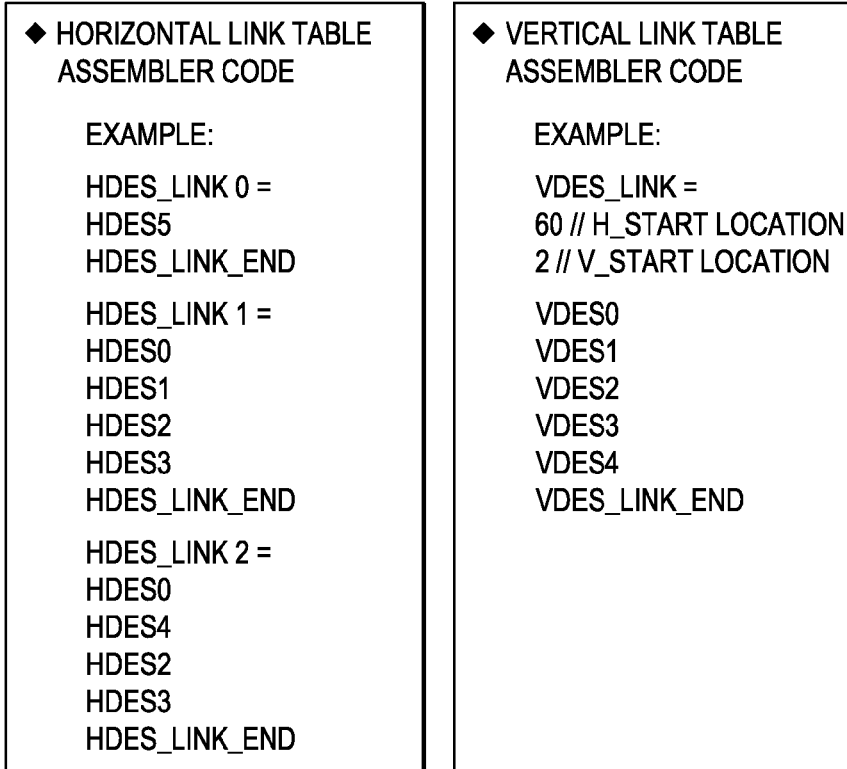

The method continues to block 240 by processing the image frame using the kernel block(s), kernel descriptor(s), and link table(s). In the present example, FIGS. 4-6 provide exemplary assembler code for implementing the descriptor-based kernel definition (such as that defined at blocks 210, 220, and 230) to define a kernel performed on an image frame during image processing, such as the kernel (defined by the kernel pattern 300) performed on the image frame 310, according to various aspects of the present disclosure. FIG. 4 provides exemplary kernel assembler code for defining a kernel, such as kernel 0 (K0) associated with the kernel pattern 300, according to various aspects of the present disclosure. FIG. 5 provides exemplary assembler code for defining horizontal descriptors and vertical descriptors associated with a kernel pattern for processing an image frame, such as horizontal descriptors and vertical descriptors associated with the kernel pattern 300 for processing the image frame 310, according to various aspects of the present disclosure. FIG. 6 provides exemplary assembler code for defining horizontal link tables and vertical link tables associated with a kernel pattern for processing an image frame, such as horizontal and vertical link tables associated with the kernel pattern 300 for processing the image frame 310, according to various aspects of the present disclosure. The assembler code in FIGS. 4-6 has been simplified for the sake of clarity to better understand the inventive concepts of the present disclosure, and variations of the assembler code illustrated in FIGS. 4-6 are contemplated by the present disclosure to provide for various embodiments. Further, though the following discussion provides exemplary assembler code for expressing the descriptor-based kernel definition, the present disclosure contemplates using various programming languages for expressing the descriptor-based kernel definition, providing the assembler code for example purposes.

In FIG. 4, the exemplary kernel assembler code can define K0. The kernel assembler code indicates a Kernel Index or ID (defining a kernel operation), a number of pipeline stages for image processing (PL_NUM NUM), ALU pipeline stage information, operation codes, other kernel information, or combinations thereof. In FIG. 5, the exemplary assembler code defines horizontal descriptors HDES0, HDES1, HDES4, and HDES5 and vertical descriptors VDES0, VDES1, and VDES3 associated with the image frame 310. The horizontal descriptor assembler code indicates a kernel associated with the horizontal descriptor, a kernel width, whether the horizontal descriptor is associated with a loop start, a loop end, or no loop, other horizontal descriptor information, or a combination thereof. The vertical descriptor assembler code indicates a horizontal link table associated with the vertical descriptor, a kernel height, whether the vertical descriptor is a loop start, a loop end, or no loop, other vertical descriptor information, or a combination thereof. In an example, the assembler code can indicate that horizontal descriptor HDES0 is associated with K0 (Kernel 0), a kernel width of about 50, and no loop (0); horizontal descriptor HDES1 is associated with K1 (Kernel 1), a kernel width of about 200, and a loop start (1); horizontal descriptor HDES4 is associated with K2 (Kernel 2), a kernel width of about 200, and a loop end (2); vertical descriptor VDES0 is associated with horizontal link table HLINK 0 (HDES_LINK 0), a kernel height of about 32, and no loop (0); vertical descriptor VDES1 is associated with horizontal link table HLINK 1 (HDES_LINK 1), a kernel width of about 80, and a loop start (1); and vertical descriptor VDES4 is associated with horizontal link table HLINK 2 (HDES_LINK 2), a kernel width of about 50, and a loop end (2). Similarly, the assembler code can further define the horizontal descriptors HDES2, HDES3, and HDES 5 and vertical descriptors VDES2 and VDES4. In FIG. 6, the exemplary assembler code defines horizontal link tables and vertical link tables associated with the image frame 310. For example, the assembler code can define horizontal link tables HLINK 0, HLINK 1, and HLINK 2 associated with the image frame 310, and vertical link table VLINK associated with the image frame 310. In the depicted example, the assembler code indicates a horizontal start location (H_START location) and a vertical start location (V_START location) for the kernel descriptors associated with the image frame 310.

Figure 7:
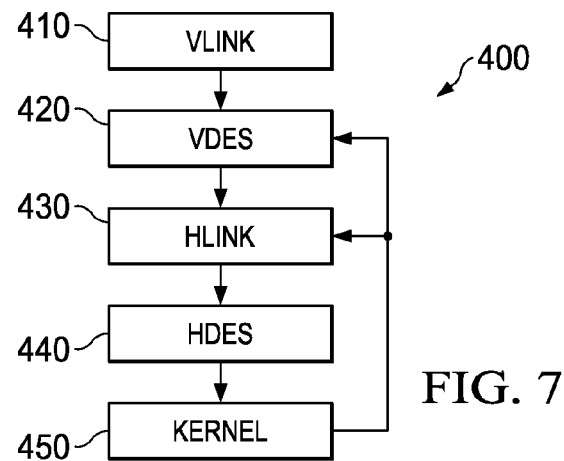
FIG. 7 is a flowchart of an exemplary method for fetching a kernel to be performed on an image frame using a descriptor-based kernel definition, such as that defined using the method of FIG. 2, which can be implemented by an image processor when processing the image frame according to various aspects of the present disclosure.

FIG. 7 is a flowchart of a method 400 for fetching a kernel (operation) to be performed on an image frame that can be implemented by an image processor when processing the image frame, such as at block 240 of the method 200, according to various aspects of the present disclosure. FIG. 7 has been simplified for the sake of clarity to better understand the inventive concepts of the present disclosure. The kernel fetching sequence of method 400 uses kernel block(s), kernel descriptor(s), and link table(s) (as described above) that define a kernel pattern of the kernel to be performed on the image frame, such as the kernel pattern 300 to be performed on the image frame 310. The method 400 begins at block 410 by fetching a vertical link (VLINK) table, for example, by fetching a vertical link table address. In an example, with reference to the kernel pattern 300 associated with the image frame 310, the method 400 can begin by fetching an address of the VLINK table associated with the image frame 310. The method 400 continues at block 420 by analyzing the VLINK table and fetching a vertical descriptor (VDES) associated with the VLINK table (in particular, fetching an address associated with the VDES). For example, for the image frame 310, analyzing the VLINK table (such as the exemplary VLINK table defined by the assembler code in FIG. 6) indicates that VDES0 is the first vertical descriptor associated with the VLINK table, so the kernel fetching sequence proceeds with fetching an address for VDES0. The method 400 at block 430 then analyzes the vertical descriptor and fetches a horizontal link (HLINK) table associated with the vertical descriptor (in particular, fetches an address associated with the HLINK table). For example, since VDES0 is associated with HLINK 0 (specified by the exemplary vertical descriptor assembler code in FIG. 5), the method 400 fetches an address of the HLINK 0 table. The method then continues at block 440 by analyzing the HLINK table and fetching a horizontal descriptor (HDES) associated with the HLINK table (in particular, fetching an address associated with the HDES). In the present example, HLINK 0 indicates that HDES5 is the first and only horizontal descriptor associated with HLINK 0, so the method 400 fetches an address of HDES5. At block 450, the method 400 analyzes the horizontal descriptor to determine a kernel associated with the horizontal descriptor, and then, fetches the kernel associated with the horizontal descriptor (in particular, fetching an address associated with the kernel). For example, kernel 0 (K0) is associated with HDES5 (as defined by the exemplary horizontal descriptor assembler code in FIG. 5), so the method 400 fetches K0. In an example, the method 400 loads K0 from memory, and thereafter, K0 operates on a portion of the image frame 310 specified by its corresponding vertical and horizontal descriptors, specifically vertical descriptor VDES0 and horizontal descriptor HDES5.

Once the portion of the image frame 310 is processed, the method 400 returns to block 420 or block 430 depending on whether there are additional horizontal descriptors associated with the HLINK table analyzed at block 430. In the present example, HLINK 0 includes the single associated horizontal descriptor HDES5. Accordingly, for processing image frame 310, the method 400 will continue to block 420 by analyzing the VLINK table and fetching a next vertical descriptor (VDES) associated with the VLINK table. For example, for the image frame 310, analyzing the VLINK table (such as the exemplary VLINK table assembler code in FIG. 6) indicates that VDES1 is the next vertical descriptor, so the kernel fetching sequence proceeds with fetching an address for VDES1. The method 400 at block 430 then analyzes the next vertical descriptor and fetches a horizontal link table (HLINK) associated with the next vertical descriptor. For example, since VDES1 is associated with HLINK 1 table (specified by the exemplary vertical descriptor assembler code in FIG. 5), the method 400 fetches an address of the HLINK 1 table. The method then continues at block 440 by analyzing the HLINK table and fetching a horizontal descriptor (HDES) associated with the HLINK table. In the present example, HLINK 1 indicates that horizontal descriptor HDES0 is the first horizontal descriptor associated with HLINK 1 table, so the method 400 fetches an address of HDES0. At block 450, the method 400 analyzes the horizontal descriptor to determine a kernel associated with the horizontal descriptor, and then, fetches the kernel associated with the horizontal descriptor (in particular, fetching an address associated with the kernel). For example, kernel 0 (K0) is associated with HDES0 (as defined by the exemplary horizontal descriptor assembler code in FIG. 5), so the method 400 fetches K0. In an example, the method 400 loads K0 from memory, and thereafter, K0 operates on a portion of the image frame 310 specified by its corresponding vertical and horizontal descriptors, vertical descriptor VDES1 and horizontal descriptor HDES0. Since HLINK 1 table further includes horizontal descriptors HDES1, HDES 2, and HDES3, the method 400 can repeat block 430 through block 450 until portions of the image frame 310 are processed by their corresponding vertical and horizontal descriptors, such as an image frame portion associated with descriptors VDES1 and HDES1, and image frame portion associated with descriptors VDES1 and HDES2, and an image frame portion associated with descriptors VDES1 and HDES3. The fetching sequence of block 420 through block 450 is then repeated until the image frame, such as the image frame 310, has been processed by the defined kernel. Additional steps can be provided before, during, and after the method 400 and some of the steps described can be replaced or eliminated for other embodiments of the method 400.

Figure 8:
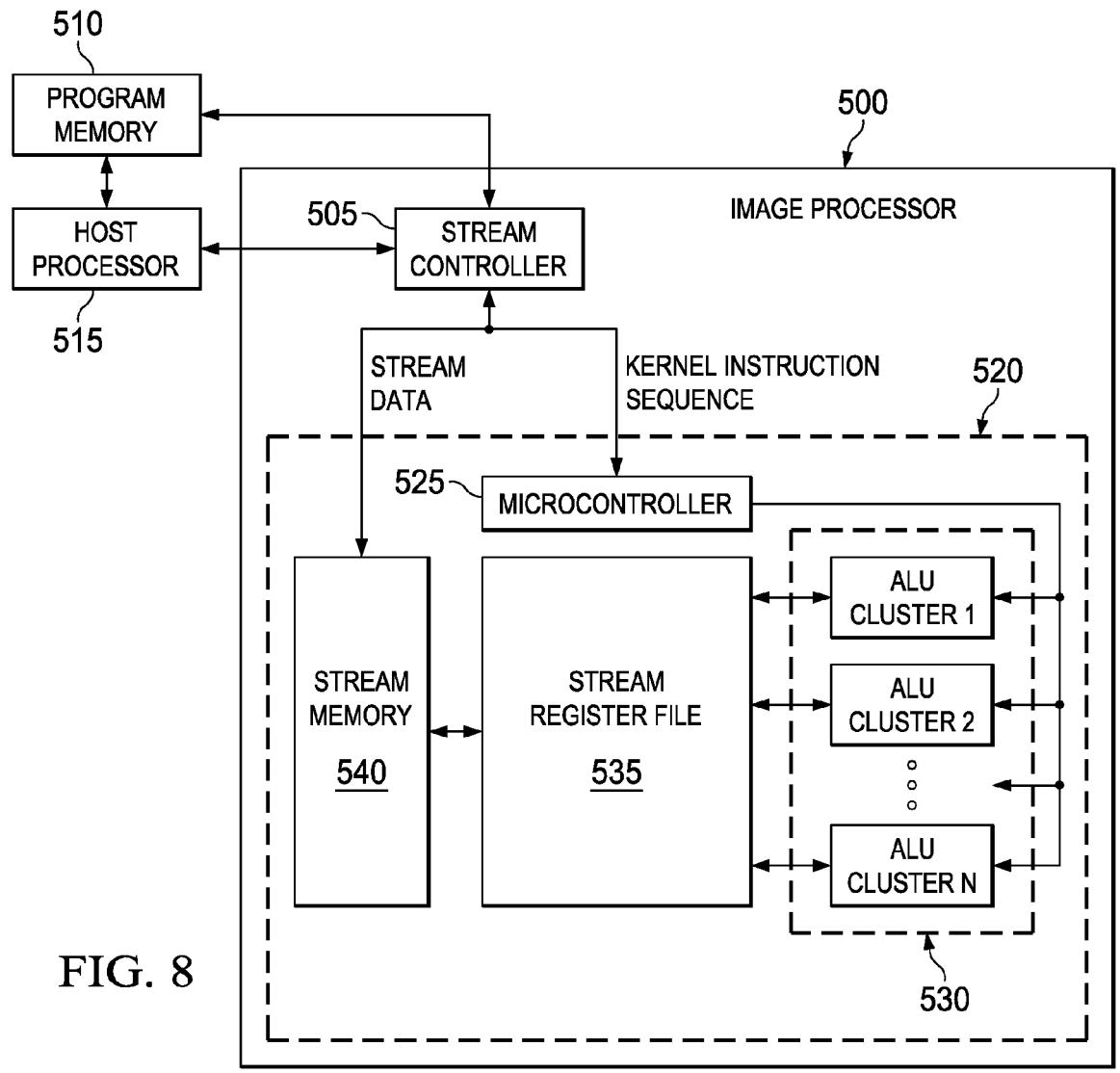
FIG. 8 is a schematic block diagram of an exemplary image processor for image processing, according to various aspects of the present disclosure.

FIG. 8 is a schematic block diagram of an image processor 500 for image processing according to various aspects of the present disclosure. In the depicted embodiment, the image processor 500 is configured as a stream image processor. The stream image processor arranges image processing applications into a set of computation kernels that operate on image data streams. FIG. 8 has been simplified for the sake of clarity to better understand the inventive concepts of the present disclosure. Additional features can be added in the image processor 500, and some of the features described below can be replaced or eliminated in other embodiments of the image signal processor 500.

The image processor 500 can include a stream controller 505 that is coupled with a program memory 510, a host processor 515, and a stream processing unit 520. The stream controller 505 can control flow of streaming operations (computations) on data (including, but not limited to, image, video, audio, or other data type). The stream controller 505 receives stream instructions from the host processor 515 (which instructions the host processor 515 can load from program memory 510), and the stream controller 505 then issues such instructions to the stream processing unit 520. In the present example, the host processor 515 issues instructions associated with kernels to be performed on an image frame for image processing and the stream controller 505 sequences the instructions to the stream processing unit 520, such that the image frame is processed by the stream processing unit 520 using the kernels, as further described below. In an example, the stream controller 505 accepts instructions from the host processor 515, stores the instructions, and determines which instructions are available for use by the stream processing unit 520.

The stream processing unit 520 can include a microcontroller 525, an arithmetic logic unit (ALU) block 530, a stream register file 535, and a stream memory 540. The microcontroller 525 controls the ALU block 530, particularly ALU Cluster 1, ALU Cluster 2, . . . ALU Cluster N (where N is a total number of ALU clusters) of the ALU block 530, such that the ALU Clusters perform kernel operations on streams of data. In the present example, the ALU Cluster 1, ALU Cluster 2, . . . ALU Cluster N perform kernel operations on streams of image date. The ALU Clusters can operate in single instruction, multiple data manner, where a same instruction is executed by the ALU clusters on different elements of the data stream. In an example, the ALU Cluster 1, ALU Cluster 2, . . . ALU Cluster N include at least one ALU and at least one local register file. The stream register file 535 can store data streams and facilitates transfer of data streams within the image processor 500, for example, between the ALU block 530 and the stream memory 540.

Figure 9:
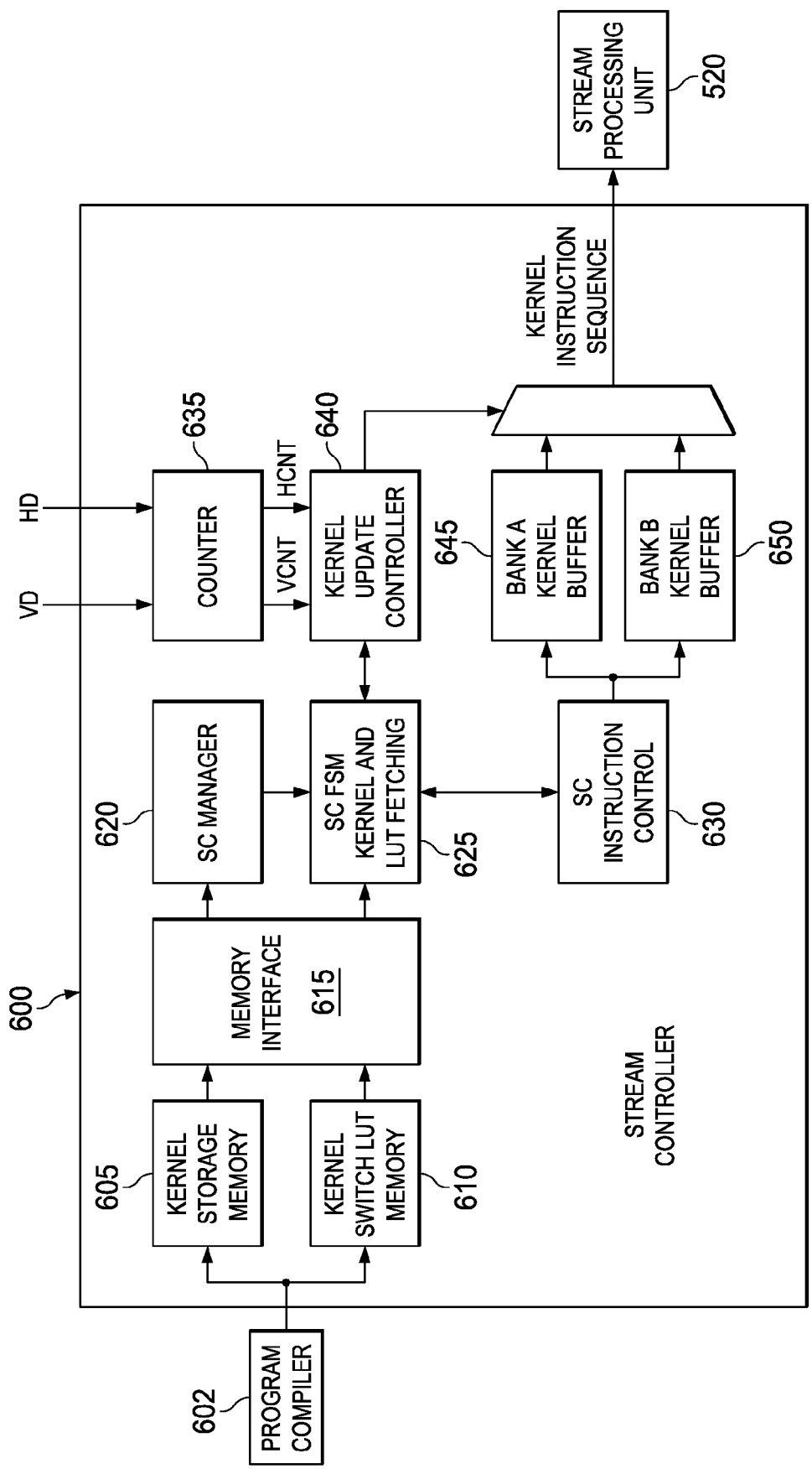
FIG. 9 is a schematic block diagram of an exemplary stream controller that can be implemented in the image processor of FIG. 8 according to various aspects of the present disclosure.

FIG. 9 is a schematic block diagram of the stream controller 600 that can be implemented in a stream processor according to various aspects of the present disclosure. In an example, the stream controller 600 can be implemented as the stream controller 505 of the image processor 500 of FIG. 8. FIG. 9 has been simplified for the sake of clarity to better understand the inventive concepts of the present disclosure. Additional features can be added in the stream controller 600, and some of the features described below can be replaced or eliminated in other embodiments of the stream controller 600.

The stream controller 600 works with a compiler 602 to implement the descriptor-based kernel definition method described herein (for example, with reference to FIGS. 1-8) for data processing. In the present example, where the stream controller 600 is implemented as the stream controller 505 of the image processor 500, the stream controller 600 works with the compiler 602 to implement the descriptor-based kernel definition for processing image data, in an example, for processing the image frame 310 according to the kernel pattern 300. The compiler 602 can be an image processing program executed in the image processor 500, which can be stored in the program memory 510 of the image processor 500. In the present example, the compiler 602 compiles a programming language that defines the kernel operations to be performed on image data. For example, the compiler 602 compiles assembler code that defines a kernel to be performed on the image frame 310 (such as the exemplary assembler code described with reference to FIGS. 4-6) to generate binary code for processing the image frame 310 according to the kernel pattern 300. The compiler 602 also generates a kernel switch look up table (LUT) based on the kernel defined by the programming language. In an example, the compiler 602 generates a kernel switch LUT based on kernel definitions associated with horizontal link tables defined by the assembler code.

The stream controller 600 includes a kernel storage memory 605. The kernel storage memory 605 stores information associated with the kernel operations to be performed on data, such as kernel identification, kernel descriptor information, kernel pattern information, other kernel information, or combinations thereof. In an example, the kernel storage memory 605 stores binary kernel code that defines the kernel operations to be performed on the data. For example, when processing image frame 310 according to the kernel pattern 300, the kernel storage memory 605 stores binary kernel code that defines kernels K0, K1, and K2 and the kernel pattern 300 associated with the kernels K0, K1, and K2. In an example, a host processor (such as host processor 515 of the image processor 500) stores the kernel binary code generated by the compiler 602 into the kernel storage memory 605.

Figure 10:
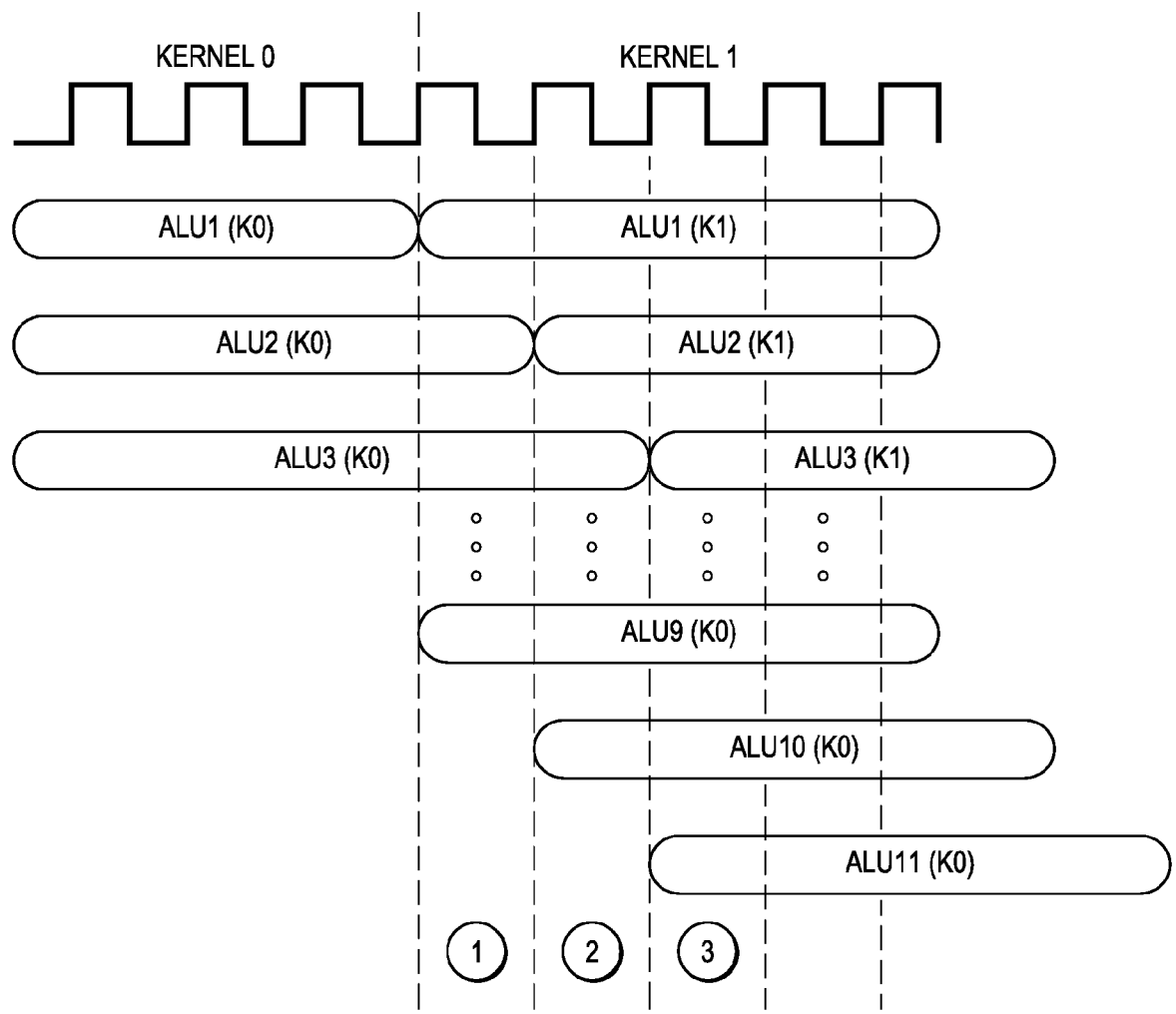
FIG. 10 is a schematic block diagram of an exemplary stream controller that can be implemented in the image processor of FIG. 8 according to various aspects of the present disclosure.

The stream controller 600 also includes a kernel switch lookup table (LUT) memory 610. The kernel switch LUT memory 610 stores a kernel lookup table associated with the kernel operations to be performed on the data, such as the kernel switch LUT generated by the compiler 602. FIG. 10 illustrates an exemplary kernel switch LUT that can be generated by a compiler based on descriptor-based kernel definitions according to various aspects of the present disclosure. In FIG. 10, the exemplary kernel switch LUT switches from kernel 0 (K0) to kernel 1 (K1). When the kernel switches happens, all ALUs of the stream processing unit 520 (for example, ALUs of the ALU block 530) are executing K0 or K1. Because the ALUs operate in a pipeline operation, in a first clock cycle, two kernel switches occur where ALU1 switches from K0 to K1, while ALU9 switches from a previous kernel to K0 (such as a kernel before K0); in a second clock cycle, ALU2 switches from K0 to K1, while ALU 10 switches from its previous kernel to K0; in a third clock cycle, ALU3 switches from K0 to K1, while ALU 11 switches from its previous kernel to K0; and so on in subsequent clock cycles. At each clock cycle, the stream controller 600 records the switch into the kernel switch LUT for execution. By generating a kernel switch LUT and updating the kernel switch LUT during image processing, the stream controller 600 facilitates kernel pipeline updating without missing data at the kernel boundary.

The stream controller 600 can further include a memory interface 615, a stream controller manager 620, a stream controller finite state machine (FSM) kernel and LUT fetching unit 625, and a stream controller instruction control unit 630. The memory interface 615 controls memory read and memory write operations, for example, memory read and memory write operations to/from the kernel storage memory 605 and the kernel switch LUT memory 610. The stream controller manager 620, the FSM kernel and LUT fetching unit 625, and the stream controller instruction control unit 630 are designed and configured to dynamically load and update kernels from memory for image processing based on processing requirements of the stream controller 600 and/or image processor 500. The stream controller 600 thus can facilitate various image processing requirements.

During operation, the stream controller 600 receives input signals, such as vertical descriptor (VD) input signal and horizontal descriptor (HD) input signal. The VD input signal indicates an image frame start flag, and the HD input signal indicates an image pixel line start flag. The VD input signal and the HD input signal are used by a counter 635 to generate respectively a vertical counter signal (VCNT) and a horizontal counter signal (HCNT) so that the stream controller 600 can determine a kernel switch boundary (where a kernel switch boundary is where the image processor 500 changes from one kernel to another while processing an image frame (such as from K0 to K1)) in both the vertical direction and the horizontal direction, and a kernel update controller 640 can update the kernel switch LUT as discussed above.

The stream controller 600 further includes a bank A kernel buffer 645 and a bank B kernel buffer 650. The bank A kernel buffer 645 and the bank B kernel buffer 650 support seamless kernel switching during image processing. For example, in operation, while the stream processing unit 520 executes a kernel stored by bank A kernel buffer 645, the stream controller 600 can fetch a next kernel for execution and store the next kernel in the bank B kernel buffer 650, and vice versa. During image processing, the kernel buffers 645 and 650 thus ping pong back and forth to support kernel switching and further support ALUs of the stream processing unit 520 executing two neighboring kernels without conflict. By supporting execution of two neighboring kernels, processing efficiency can be improved and hardware costs and size can be reduced (for example, a number of ALUS of the stream processing unit 520 can be reduced). The kernel buffers 645 and 650 work with the pipeline kernel switching LUT to achieve the seamless kernel switching.

The stream controller 600 thus facilitates and supports flexible, multiple kernel image processing without diminishing processing efficiency or increasing hardware costs or overhead. The stream controller 600 further facilitates kernel switching without losing data at the kernel boundaries. In contrast, conventional stream processors typically process an image frame using a same kernel, lacking the ability to process the image frame using multiple kernels. Though some conventional stream processors can support kernel switching in image processing an image frame, such kernel switching is accomplished by adding additional computation resources, such as additional ALUs, memory, other computation resources, or combinations thereof, thereby undesirably increasing processor area overhead and costs.

Figure 11:
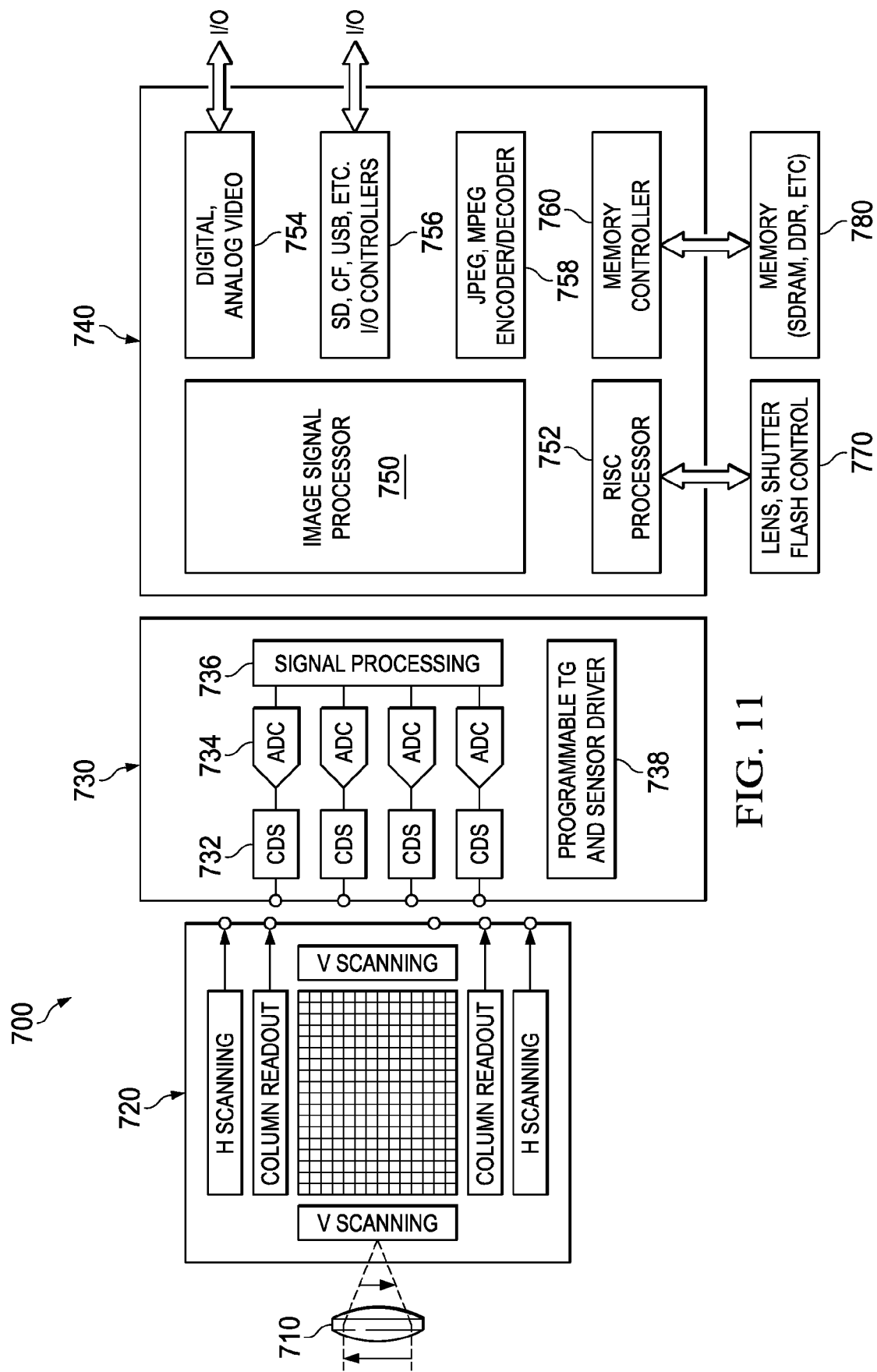
FIG. 11 is a schematic block diagram of an exemplary camera that can implement the stream controller of FIG. 9 according to various aspects of the present disclosure.

FIG. 11 is a schematic block diagram of a camera 700, such as a digital camera, according to various aspects of the present disclosure. The camera 700 includes a lens portion 710, an image sensor portion 720, a front-end portion 730, and a back-end portion 740. In an example, the front-end portion 730 is an analog and digital portion, and the back-end portion 740 is a digital portion. The front-end portion 730 can include correlated double sampler(s) 732, analog-to-digital converter(s) 734, a signal processing unit 736 (for example, a digital signal processor), and a programmable timing generator and image sensor driver unit. The back-end portion 740 includes an image signal processor 750. In an example, the image signal processor 750 is a stream image processor that implements the stream controller 600 and descriptor-based kernel definition methods discussed herein (for example, described with reference to FIGS. 1-10). The back-end portion 740 can further include a reduced instruction set computer (RISC) processor 752, a digital, analog video unit 754, an input/output (I/O) controller unit 756, a JPEG and/or MPEG encoder/decoder unit 758, and a memory controller 760. The camera 700 can further include a lens, shutter, flash control unit 770 and a memory unit 780 (for example SDRAM, DDR, etc.). FIG. 11 has been simplified for the sake of clarity to better understand the inventive concepts of the present disclosure. Additional features can be added in the camera 700, and some of the features described below can be replaced or eliminated in other embodiments of the camera 700.

The specifications, dimensions, and relationships outlined herein have only been offered for purposes of example and teaching only. Each of these may be varied considerably without departing from the spirit of the present disclosure, or the scope of the appended claims. The specifications apply only to one non-limiting example and, accordingly, they should be construed as such. In the foregoing description, example embodiments have been described with reference to particular processor arrangements. Various modifications and changes may be made to such embodiments without departing from the scope of the appended claims. The description and drawings are, accordingly, to be regarded in an illustrative rather than a restrictive sense.

The operations and steps described with reference to the preceding FIGURES illustrate only some of the possible scenarios that may be executed by, or within, the various apparatuses, processors, devices, and/or systems, described herein. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In example implementations, at least some portions of the processing activities outlined herein may be implemented in software. In some embodiments, one or more of these features may be implemented in hardware, provided external to the elements of FIGS. 1-11, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, image processor 500, stream controller 600, and camera 700 respectively described herein (and/or its associated structures) may also include suitable interfaces for receiving, transmitting, and/or otherwise communicating data or information in a network environment. Additionally, some of the components associated with the described processors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (for example, software, logic, code, etc.) in non-transitory media such that the instructions are executed to carry out the activities described herein. Any suitable processor component can execute any type of instructions associated with the data to achieve the operations detailed herein. In one example, image processor 500, stream controller 600, and camera 700 respectively could transform an element or an article (for example, data) from one state or thing to another state or thing. In another example, the activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, image processor 500 and/or stream controller 600 respectively may keep information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in image processor 500, stream controller 600, and camera 700 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Embodiment Implementations

One particular example implementation may include means for (for example, software, logic, code, hardware, or a combination thereof) defining a kernel pattern associated with an image frame; and processing the image frame using the defined kernel pattern. Various implementations may further include means for defining a kernel block associated with the image frame; defining a kernel descriptor associated with the image frame; and defining a link table associated with the image frame.

What is claimed is:

1. A method for processing an image using a processor, wherein the processor can dynamically switch among multiple kernels, the method comprising:

defining a kernel pattern associated with an image frame by grouping image pixels into a plurality of kernel blocks, wherein each kernel block has a respective kernel for performing at lest one operation on image pixels in the kernel block, and determining a kernel sequence for the respective kernels; and processing the image frame using the defined kernel pattern.

2. The method of claim 1, wherein defining the kernel pattern associated with the image frame includes generating a link table associated with the image frame to record the kernel sequence.

3. The method of claim 2, wherein the generating the link table associated with the image frame includes generating a horizontal link table and a vertical link table.

4. The method of claim 1, further including generating a kernel switch lookup table based on the defined kernel patterns, wherein the kernel switch lookup table records kernel switches.

5. The method of claim 4, further comprising updating the kernel switch look up table during image processing and updating a kernel pipeline to prevent data loss at a kernel boundary.

6. The method of claim 1, further comprising defining a plurality of kernel descriptors associated with the image frame, including:
   partitioning the image frame into groups of horizontal pixel lines and vertical pixel lines to define a plurality of image frame portions, each having a respective one of the kernel descriptors; and
   defining a plurality of vertical descriptors and a plurality of horizontal descriptors, wherein each kernel descriptors includes a respective vertical descriptor and a respective horizontal descriptor, and defines kernel attributes associated with one of the plurality of image frame portions.

7. The method of claim 6, wherein the defining the plurality of horizontal descriptors includes, for each descriptor:
   associating a kernel with the image frame portion;
   defining a kernel width associated with the image frame portion; and
   determining a loop characteristic associated with the image frame portion in a horizontal direction.

8. The method of claim 6, wherein defining the plurality of vertical descriptors includes, for each vertical descriptor:
   associating a link table with the image frame portion;
   defining a kernel height associated with the image frame portion; and
   determining a loop characteristic associated with the image frame portion in a vertical direction.

9. The method of claim 1, wherein the processing the image frame using the defined kernel patterns includes:
   fetching a vertical link table associated with the image frame;
   fetching a vertical descriptor associated with the vertical link table;
   fetching a horizontal link table associated with the vertical descriptor;
   fetching a horizontal descriptor associated with the horizontal link table;
   fetching a kernel associated with the horizontal descriptor; and
   determining a kernel switch boundary indicating where an image frame portion associated with the kernel ends.

10. The method of claim 9 wherein the processing further includes processing, using the kernel, an image frame portion associated with the vertical descriptor and the horizontal descriptor.

11. The method of claim 1, wherein a kernel includes a plurality of operations to be performed on an image pixel.

12. A non-transitory computer readable medium encoded with instructions that when executed by a processor cause execution of a method for processing an image, wherein the processor can dynamically switch among multiple kernels, the method comprising:
   defining a kernel pattern associated with an image frame frame by
      grouping image pixels into a plurality of kernel blocks, wherein each kernel block has a respective kernel for performing at least one operation on image pixels in the kernel block, and
      determining a kernel sequence for the respective kernels; and
   processing the image frame using the defined kernel pattern.

13. The non-transitory computer readable medium of claim 12, wherein defining the kernel pattern associated with the image frame includes generating a link table associated with the image frame to record the kernel sequence.

14. The non-transitory computer readable medium of claim 12, wherein the method further comprises generating a kernel switch lookup table based on the defined kernel patterns, wherein the kernel switch lookup table records kernel switches.

15. The non-transitory computer readable medium of claim 12, wherein the processing includes:
   fetching a vertical link table associated with the image frame;
   fetching a vertical descriptor associated with the vertical link table;
   fetching a horizontal link table associated with vertical descriptor;
   fetching a horizontal descriptor associated with the horizontal link table;
   fetching a kernel associated with the horizontal descriptor;
   determining a kernel switch boundary indicating where an image frame portion associated with the kernel ends; and
   processing the image frame using the kernel.

16. The non-transitory computer readable medium of claim 12, further comprising updating the kernel switch look up table during image processing and updating a kernel pipeline to prevent data loss at a kernel boundary.

17. An apparatus for processing an image by dynamically switching among multiple kernels, comprising:
   a stream controller that includes:
      a kernel storage memory for storing a plurality of defined kernel patterns associated with an image frame, wherein a kernel pattern includes kernel blocks, each including a group of image pixels and having a kernel for performing an operation on image pixels in the group, and a kernel sequence for the respective kernels, and
      a kernel look up table (LUT) memory for storing a kernel switch lookup table associated with the plurality of defined kernel patterns, wherein the kernel lookup table records kernel switches;
   wherein the stream controller is operable to direct execution of kernels on the image frame according to the plurality of defined kernel patterns and the kernel switch lookup table.

18. The apparatus of claim 17, wherein the stream controller further includes at least two kernel buffers for storing the kernels to be performed on the image frame.

19. The apparatus of claim 17, further including an image processor that includes a stream processing unit, wherein the stream controller is operable to direct the stream processing unit to execute the kernels on the image frame according to the defined kernel patterns.

20. The apparatus of claim 17, further including a compiler operable to generate the kernel switch look up table based on the plurality of defined kernel patterns.

\* \* \* \* \*